United States Patent [19]
Freeman

[11] Patent Number: 5,657,833
[45] Date of Patent: Aug. 19, 1997

[54] SELF-CONTAINED UNITIZED LUBRICANT DELIVERY APPARATUS

[76] Inventor: Lewis Gene Freeman, 1509 Pontiac Dr., Kokomo, Ind. 46902

[21] Appl. No.: 567,423

[22] Filed: Dec. 5, 1995

[51] Int. Cl.$^6$ .................. F16N 1/00; B22D 17/04
[52] U.S. Cl. .................. 184/18; 184/14; 164/267
[58] Field of Search .................. 184/6, 14, 18, 184/24; 164/72, 267; 264/39, 169; 425/90, 96; 222/386

[56] References Cited

U.S. PATENT DOCUMENTS

| | | |
|---|---|---|
| 2,561,360 | 7/1951 | Goss . |
| 3,626,043 | 12/1971 | Flipot et al. . |
| 3,686,013 | 8/1972 | Williams . |
| 5,076,339 | 12/1991 | Smith . |
| 5,337,800 | 8/1994 | Cook ........................... 164/72 |

FOREIGN PATENT DOCUMENTS

| | | | |
|---|---|---|---|
| 0128159 | 5/1991 | Japan ........................... | 164/72 |
| 0984658 | 1/1983 | U.S.S.R. ........................... | 164/267 |

*Primary Examiner*—Thomas E. Denion
*Assistant Examiner*—Christopher Verdier
*Attorney, Agent, or Firm*—Fildes & Outland, P.C.

[57] ABSTRACT

Self-contained lubricant delivery apparatus for crushing unitized lubricant elements and delivering flowable lubricant from the crushed elements to lubricant requiring portions of a die casting machine. The apparatus includes a cylinder body defining a delivery cylinder closable by an end wall of a movable reaction body and which is opened by an actuating cylinder for insertion of an element of flowable lubricant in a crushable container or formed as a pellet. When the delivery cylinder is closed, a ram in the cylinder crushes the lubricant element against the end wall, forcing the lubricant through a restricted passage and hydraulic conduit to the lubricant requiring portion of the die casting machine.

17 Claims, 3 Drawing Sheets

5,657,833

1

SELF-CONTAINED UNITIZED LUBRICANT DELIVERY APPARATUS

FIELD OF THE INVENTION

This invention relates to the lubrication of die casting machines and more particularly to self-contained delivery apparatus for lubricating a die cavity or other lubricant requiring portion of a die casting machine using a unitized or packaged lubricant.

BACKGROUND OF THE INVENTION

For many years, a primary method of applying lubricants or die release agents to the surfaces of a die casting die has been through spraying of a liquid carried lubricant onto the die cavity surfaces when the die pair is open. More recently, several forms of lubricating mechanisms or apparatus for use in conjunction with die casting machines have been proposed. These have included devices for introducing various forms of bulk lubricants into the die cavity or shot sleeve of the die casting machine as well as the application of a meltable lubricant into a shot sleeve for delivery to the die surfaces along with molten casting metal. However, suitable apparatus for providing die lubrication with a unitized, pelletized or packaged, flowable lubricant delivered to a plunger or forced into a die cavity or shot sleeve prior to metal introduction remain undisclosed.

SUMMARY OF THE INVENTION

The present invention provides self-contained apparatus for use in conjunction with die casting machines which is operative to deliver lubricant from unitized lubricant pellets or containers to lubricant requiring portions of such machines. Such portions may include, for example, the die cavity, shot sleeve and shot plunger of an associated die casting machine.

In a representative embodiment, a self contained unitized lubricant delivery apparatus according to the invention includes a support separate from an associated die casting machine; a cylinder body mounted on the support and defining a delivery cylinder having an inner end; a reaction body mounted on the support and defining an end wall facing the cylinder inner end and movable between an apparatus opened position, spaced from the cylinder inner end and allowing access thereto, and an apparatus closed position against and partially closing the cylinder inner-end; a restricted passage connecting the partially closed inner end with an outlet fitting; a hydraulic conduit connecting the outlet fitting with a lubricant requiring portion of an associated die casting machine; a ram reciprocable in the cylinder between an advanced position near the cylinder inner end and a retracted position spaced away from the cylinder inner end; and an actuator for driving the ram between the retracted and advanced positions to crush a unitized lubricant element within the cylinder against the end wall and force the lubricant through the restricted passage to the lubricant requiring portion of the die casting machine.

The apparatus preferably includes various members for supporting and guiding the co-acting cylinder and reaction bodies including a second actuator for moving the reaction body between the apparatus open and closed positions. In the open position, a unitized lubricant element may be placed within the delivery cylinder through the open end thereof.

Unitized lubricant elements which are usable in the delivery apparatus may include packaged or containerized lubricants including flowable liquid or semi-solid (such as solid/liquid composite) lubricants sealed in a container. The container is ruptured by crushing with the ram against the closed end of the cylinder and squeezing the lubricant through the restricted passage to the lubricant requiring portion. A non-containerized pellet of lubricant, which is flowable under pressure, may alternatively be used. Further details of unitized lubricant elements which can be used in die lubricating apparatus according to the invention are set forth in my copending U.S. patent application Ser. No. 08/567,421, filed contemporaneously with this application.

Lubricant from the crushed pellets may be delivered to any desired location of an associated die casting machine. For example, the lubricant may be delivered to a die cavity when the dies are closed by forcing it through passages provided along the die parting line at any suitable location. Lubricant may also be delivered to the interior of the shot sleeve through a special port or through the normally provided fill port for pouring casting metal. Also lubricant may be provided directly to the shot plunger when it is retracted to extend out of the shot sleeve.

These and other features and advantages of the invention will be more fully understood from the following description of certain exemplary embodiments of the invention taken together with the accompanying drawings.

DETAILED DESCRIPTION OF THE INVENTION

Figure 1:
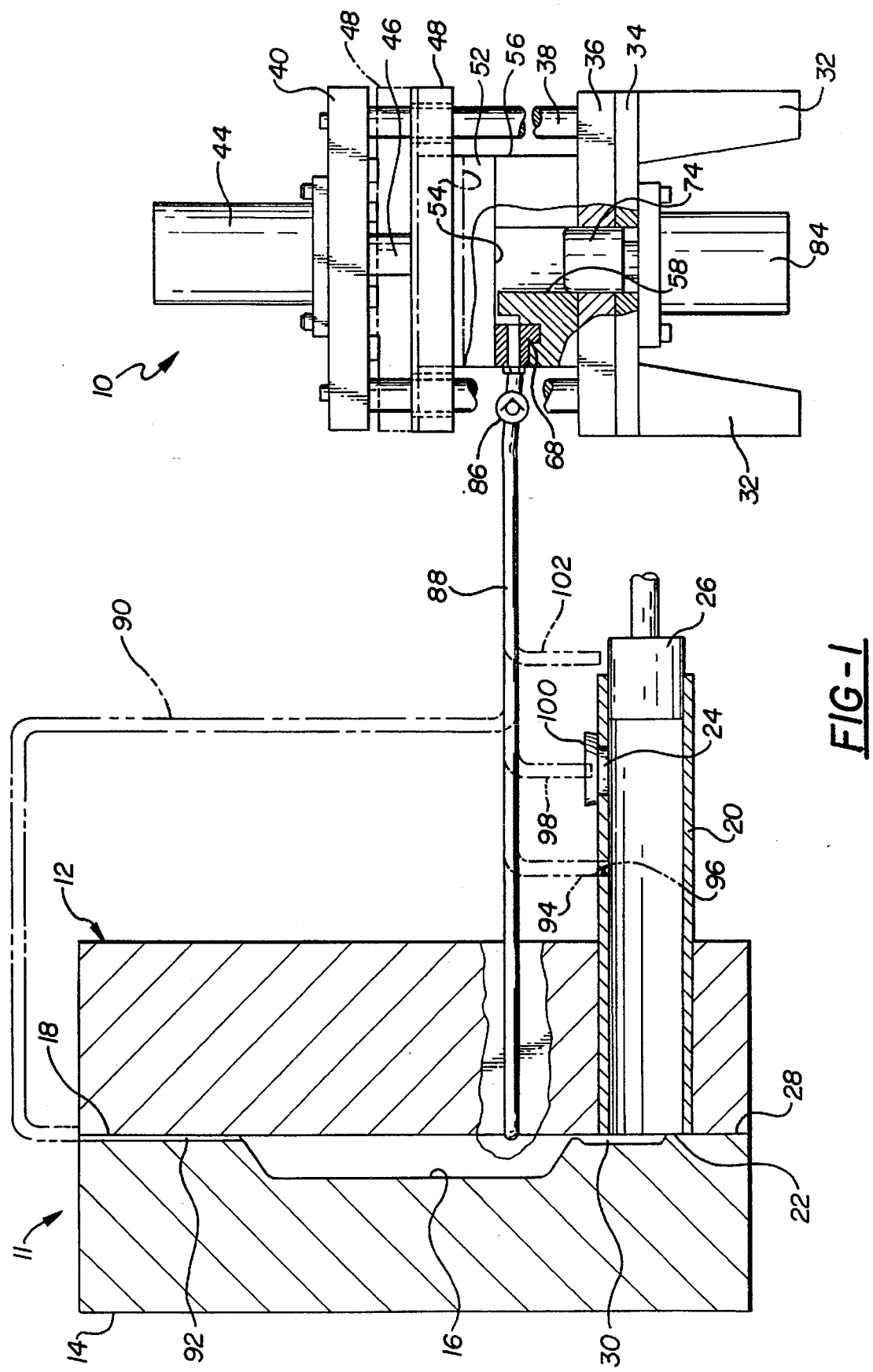
FIG. 1 is a semi-schematic side view partially in cross-section illustrating one embodiment of delivery apparatus according to the invention as connected with a die casting machine.

Referring now to the drawings now in detail, FIG. 1 illustrates one embodiment of a self contained unitized lubricant delivery apparatus, generally indicated by numeral 10, and its connection with a conventional die casting machine illustrated schematically and generally indicated by numeral 11. The die casting machine 11 includes a stationary cover die 12 and a movable ejector die 14. When closed, the dies define an internal die cavity 16 defined by opposing walls of the dies including a recess in at least one die. The opposing die walls are separable generally along a parting line 18.

Within the stationary die 12, a shot sleeve 20 extends through to an open inner end 22 at the parting line 18. The shot sleeve 20 extends outward of the stationary die 12 to an opposite end near which a fill opening 24 is provided for admitting a charge of molten die casting metal during operation of the die casting machine. A plunger 26 is reciprocably movable within the shot sleeve for forcing the molten die casting metal into the die cavity 16. If the die casting machine is so equipped, vacuum will be applied to the closed die cavity prior to the admission of the die casting metal in order to minimize casting porosity as is well known.

Figure 2:
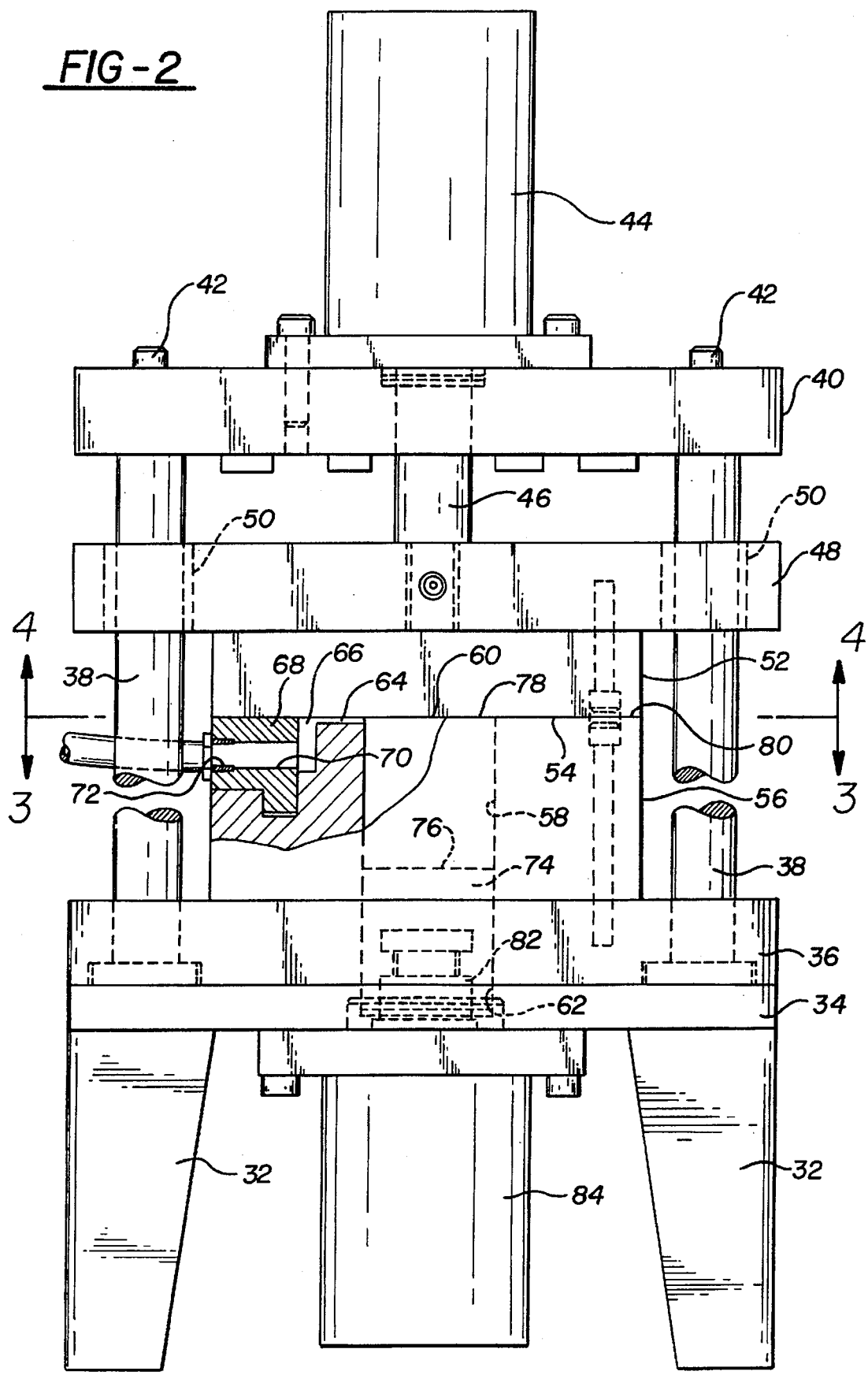
FIG. 2 is a side view partly in cross section of the primary portion of the self-contained apparatus of FIG. 1.

When the dies are closed, as in FIGS. 1 and 2, a wall 28 of the movable die closes the inner end 22 of the shot sleeve, except for a runner and gate which form a restricted passage 30 through which the molten metal is forced from the interior of the shot sleeve into the die cavity 16. When the dies are opened, the inner end of the shot sleeve is also opened by movement of the wall 28 away from the end 22 and a completed die cast part may be removed from the die.

In order to provide lubrication where needed in the die casting machine as, for example, in the die cavity 16 and shot sleeve 20 and on the plunger 26, the free standing self contained lubricant delivery apparatus 10 is provided. Additional details of the construction features of apparatus 10 are best shown by reference to FIGS. 2–4.

The free standing apparatus 10 includes a support comprising legs 32 carrying a base plate 34 which in turn carries a support plate 36. Four guide posts 38 are supported on and adjacent to corners of the base plate 34 and are maintained in position by openings in the support plate 36. The guide posts extend upwardly into recesses in a top plate 40 which is carried on the upper ends of the guide posts and secured thereto by fasteners.

Top plate 40 supports an actuator in the form of an actuating cylinder 44 mounted to and extending upwardly from the plate 40. Cylinder 44 includes an actuating rod 46 that extends through an opening in the top plate and is attached to a carrier plate 48. The carrier plate is movable vertically by the actuating cylinder 44, guided by the guide posts 38 which engage bushings 50 retained in openings of the carrier plate 48 through which the guide posts extend. On its lower surface, carrier plate 48 carries a reaction body in the form of a block 52 having a lower end wall 54 which faces downwardly toward the support plate.

Centered below the reaction body 52, there is mounted upon the support plate 36 a cylinder body 56. This body centrally defines a delivery cylinder 58 extending through the body 56 as well as through the support plate 36 and the lower base plate 34. Cylinder 58 has an upper (or inner) end 60 and a lower (or outer) end 62. Connecting with the inner end 60, a groove 64 defines a restricted passage connecting the inner end of the cylinder 58 through a connecting vertical groove 66 with an outlet fitting 68 having a through passage 70 opening to a threaded outlet 72.

Within the cylinder 58, a cylindrical ram 74 is reciprocably mounted having a closed inner end 76. The ram is movable from a retracted position shown in the drawings to an advanced position closely adjacent a parting line 78 defined at the inner end of cylinder 60 by an inner wall 80 of the cylinder body 56. The ram 74 is attached by a suitable connection to an actuating rod 82 of an actuating cylinder 84 which is mounted to the under side of the base plate 34 with the rod 82 extending through a central opening to connect with the ram 74.

Referring back to FIG. 1, the outlet fitting 68 preferably connects through a check valve 86 with a hydraulic conduit 88 which may be in the form of a pipe, tube, hose or the like. Conduit 88 connects the outlet fitting 68 with any desired portion of the die casting machine 11 which requires lubrication. As illustrated, conduit 88, shown in solid lines, connects with the die cavity 16 through a side opening and internal passage, not shown, located along the parting line 18 of the dies. Optionally, the conduit 88 could be relocated or expanded to connect with other points of the die casting machine. Some of these are indicated by phantom lines showing some of the alternative positions.

Figure 3:
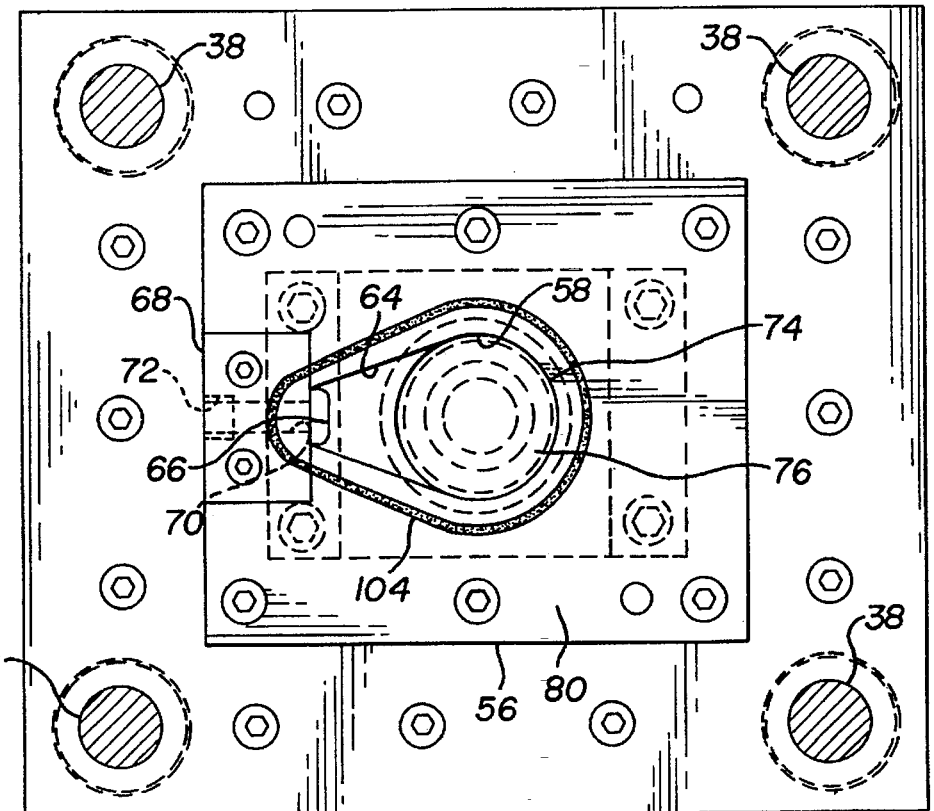
FIG. 3 is a downward view of the cylinder body portion from the line 3—3 of FIG. 2.
Figure 4:
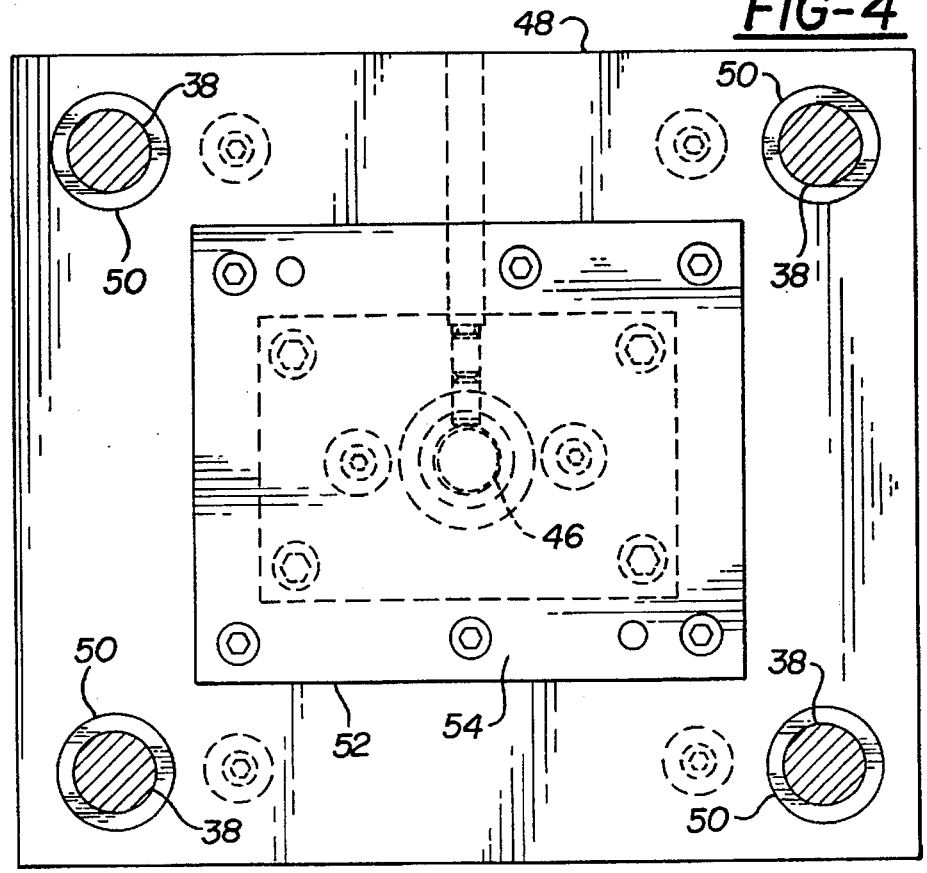
FIG. 4 is an upward view of the reaction body portion from the line 4—4 Of FIG. 2.

For instance, alternate conduit 90 is shown connecting with die cavity 16 through an internal passage 92 extending along the parting line 18 from the upper side of the dies to the cavity 16. Alternative conduit 94 connects directly with the interior of the shot sleeve 20 through a supplemental opening 96 provided in the shot sleeve. Alternative conduit 98 is shown connecting with the shot sleeve through the normal fill opening 24, a plug 100 being provided on the end of conduit 98 for closing the fill opening during injection of the lubricant. For this arrangement, means must be provided for moving the plug 100 and conduit (hose) 98 away from the fill opening in order to allow for pouring of molten die casting metal in the die casting process. This may be accomplished by any suitable means or mechanism. Alternative conduit 102 is positioned for the delivery of lubricant directly onto the shot plunger 26 of the die casting die. Obviously other suitable locations for delivering lubricant to a lubricant requiring portion of the die casting machine could be used if desired. If required, one or more seals may be provided where needed to prevent or reduce lubricant leakage from the apparatus. For example, FIG. 3 shows one possible location for a seal 104 in the wall 80 and outlet fitting 68 surrounding the inner end 60 of the delivery cylinder 58 and the connecting passage grooves 64, 66.

In operation of the lubricant delivery apparatus 10, actuating cylinder 44 is operated to raise the carrier plate 48 to the upper position against top plate 40, as shown by phantom lines in FIG. 1. This moves the end wall 54 of the block 52 away from the inner end 60 of cylinder 58, allowing access to the open inner end of the cylinder in order to insert a unitized lubricant element of any suitable type. After insertion of the lubricant element, the carrier plate 48 is again lowered until the end wall 54 engages the inner wall 80 of the cylinder body, closing the inner end 60 of the cylinder 58. For lubricating the die cavity 16 or shot sleeve 20, the dies would be closed. Where possible, vacuum may be applied to the closed cavity and shot sleeve to aid distribution of lubricant within these connected chambers.

At this point, the lower actuating cylinder 84 is operated to move the ram 74 upward in cylinder 58, crushing the lubricant element against the end wall 54 which closes the end of the cylinder. The flowable lubricant in the lubricant element is thereby squeezed out of the cylinder 58 and through the restricted passage defined by grooves 64 and 66 and the outlet fitting 68. When the system is properly filled, liquid or flowable lubricant continues from the outlet fitting 68 through the check valve 86 and conduit 88, or optionally through one or more of the optional conduits 90, 94, 98 and 102, into or upon the lubricant requiring portion of the die casting machine to which the lubricant conduits are directed or connected. Thereafter, cylinder 44 is actuated to again raise the carrier plate 48, opening the end of cylinder 60 and allowing the removal of a crushed lubricant container, if a containerized lubricant element was used. Then cylinder 84 is actuated to lower (or retract) the ram 74, providing space within the cylinder 58 into which another unitized lubricant element may be placed for repetition of the process.

The method of operation and various forms of unitized lubricant elements usable with unitized lubricant delivery apparatus, including that of the type just described, are outlined in substantial detail in my copending application Ser. No. 08/567,421 previously mentioned.

It should be understood that the form of elements such as the cylinder and piston, which could be other than circular in cross section; the restricted passage grooves 64, 66, which could be varied in configuration; and various other elements of the delivery apparatus may be changed in shape, location or orientation without changing the essential operating method and structural relationships of the embodiments of the invention just described.

Thus, while the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. Self-contained unitized lubricant delivery apparatus for a die casting machine having a stationary die and a movable die forming a die pair defining, when closed, a die cavity separable at a parting line between the dies, said movable die being movable toward and away from said stationary die to die closed and die open positions of the die pair, and means for delivering molten casting metal under pressure to said die cavity to form a die cast product; said apparatus characterized by:

a support separate from said die casting machine;

a cylinder body mounted on said support and defining a delivery cylinder having an inner end and an outer end;

a reaction body mounted on said support and defining an end wall facing said cylinder inner end and movable between an apparatus open position spaced from said cylinder inner end and allowing access thereto for inserting a unitized lubricant element, and an apparatus closed position against and partially closing said cylinder inner end;

a restricted passage connecting said partially closed inner end of the delivery cylinder with an outlet fitting;

a hydraulic conduit connecting said outlet fitting with a lubricant requiring portion of said die casting machine;

a ram reciprocable in said cylinder between an advanced position near said cylinder inner end and a retracted position spaced outwardly away from said inner end; and a first actuator for driving said ram between said retracted and advanced positions to crush said unitized lubricant element in said cylinder against said end wall and force said lubricant through said restricted passage to said lubricant requiring portion of the die casting machine.

2. Apparatus as in claim 1 characterized by a second actuator on said support and connected with said reaction body for moving said end wall between said apparatus closed and open positions.

3. Apparatus as in claim 1 characterized in that said support includes a base plate, guide posts carried by said base plate, a top plate supported by said guide posts, a carrier plate movably supported on said top plate by a second actuator and guided by said guide posts, said carrier plate carrying said reaction body.

4. Apparatus as in claim 3 characterized in that said base plate also carries a support plate that locates said guide posts and carries said cylinder body.

5. Apparatus as in claim 1 characterized in that said restricted passage is formed in part by a groove located between said cylinder body and said end wall in the apparatus closed position and connecting said delivery cylinder with said outlet fitting.

6. Apparatus as in claim 1 characterized by a check valve between said cylinder and said lubricant requiring portion to prevent blow back of lubricant to said cylinder.

7. Apparatus as in claim 1 characterized in that said hydraulic conduit is positioned to deliver lubricant to said die cavity along the split line between said dies.

8. Apparatus as in claim 1 characterized in that said hydraulic conduit is positioned to deliver lubricant to a shot sleeve of said die pair.

9. Apparatus as in claim 1 characterized in that said hydraulic conduit is positioned to deliver lubricant to a plunger of said die pair.

10. Apparatus as in claim 1 characterized in that said delivery cylinder and said ram are of circular cross section.

11. Apparatus as in claim 2 characterized in that said first and second actuators are power driven.

12. Apparatus as in claim 2 characterized in that at least one of said actuators is a direct connected actuating cylinder.

13. Self-contained unitized lubricant delivery apparatus characterized by:

a support;

a cylinder body mounted on said support and defining a delivery cylinder having an inner end and an outer end;

a reaction body mounted on said support and defining an end wall facing said cylinder inner end and movable between an apparatus open position spaced from said cylinder inner end and allowing access thereto for inserting a unitized lubricant element, and an apparatus closed position against and partially closing said cylinder inner end;

a restricted passage connecting said partially closed inner end of the delivery cylinder with an outlet;

a ram reciprocable in said cylinder between an advanced position near said cylinder inner end and a retracted position spaced outwardly away from said inner end; and a first actuator for driving said ram between said retracted and advanced positions to crush said unitized lubricant element in said cylinder against said end wall and force said lubricant through said restricted passage to said outlet.

14. Apparatus as in claim 13 characterized by a second actuator on said support and connected with said reaction body for moving said end wall between said apparatus closed and open positions.

15. Apparatus as in claim 13 characterized in that said support includes a base plate, guide posts carried by said base plate, a top plate supported by said guide posts, a carrier plate movably supported on said top plate by a second actuator and guided by said guide posts, said carrier plate carrying said reaction body.

16. Apparatus as in claim 15 characterized in that said base plate also carries a support plate that locates said guide posts and carries said cylinder body.

17. Apparatus as in claim 13 characterized in that said restricted passage is formed in part by a groove located between said cylinder body and said end wall in the apparatus closed position and connecting said delivery cylinder with said outlet.

* * * * *